United States Patent
Warner

[19]

[11] Patent Number: 6,164,736

[45] Date of Patent: Dec. 26, 2000

[54] TRACKED WHEEL ASSEMBLY

[75] Inventor: Joseph G. Warner, Macomb County, Mich.

[73] Assignee: The United States of America as represented by the Secretary of the Army, Washington, D.C.

[21] Appl. No.: 09/374,868

[22] Filed: Aug. 16, 1999

[51] Int. Cl.[7] ...................................................... B60B 9/00
[52] U.S. Cl. ........................... 305/136; 305/125; 305/156
[58] Field of Search ................................ 152/97, 99, 103; 305/136, 137, 125, 138, 156, 143, 199

[56] References Cited

U.S. PATENT DOCUMENTS

| 931,505 | 8/1909 | Shaw | 152/103 |
|---|---|---|---|
| 1,220,709 | 3/1917 | Wheatley | 152/103 |
| 1,320,173 | 10/1919 | Ray et al. | 152/103 |
| 1,383,829 | 7/1921 | Leathers | 152/103 |
| 1,421,584 | 7/1922 | Shafer | 152/103 |
| 1,525,615 | 2/1925 | Lorenz | 152/103 |
| 1,562,928 | 11/1925 | Towe | 152/103 |
| 1,678,693 | 7/1928 | Eaid | 152/103 |
| 1,767,572 | 6/1930 | Bishton | 152/103 |
| 1,890,442 | 12/1932 | Altuna | 152/103 |
| 5,303,992 | 4/1994 | Grainger | 305/199 |

*Primary Examiner*—S. Joseph Morano
*Assistant Examiner*—Long Bao Nguyen
*Attorney, Agent, or Firm*—Peter A. Taucher; David L. Kuhn

[57] ABSTRACT

A shock absorbing, tracked wheel assembly of an off-road vehicle has a set of spoke-like structures radiating from the assembly's center or spider. The spoke-like structures include cylinders affixed to the spider and pistons axially translatable in the cylinders. The pistons are biased radially outward by coil springs in the cylinders. The springs' action is dampened by a flow restrictive collar girding the piston and separating fluid in the cylinder into separate chambers. Struts extend from the pistons and the struts have track engagement shoes on their outer ends. The shoes have a generally arcuate sector that engages a track or band in tractive contact with the ground. Rotating the struts about their longitudinal axis will vary the distance between the cylinder and the track shoe so that tension on the track can be adjusted. Sufficient strut rotation allows the track to be removed from the assembly for purposes of track repair or replacement.

5 Claims, 3 Drawing Sheets

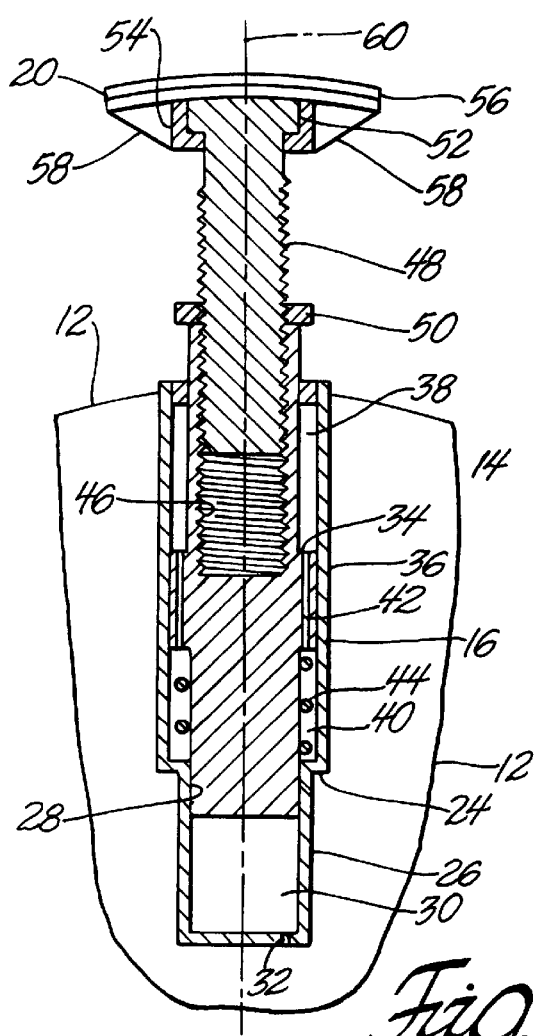
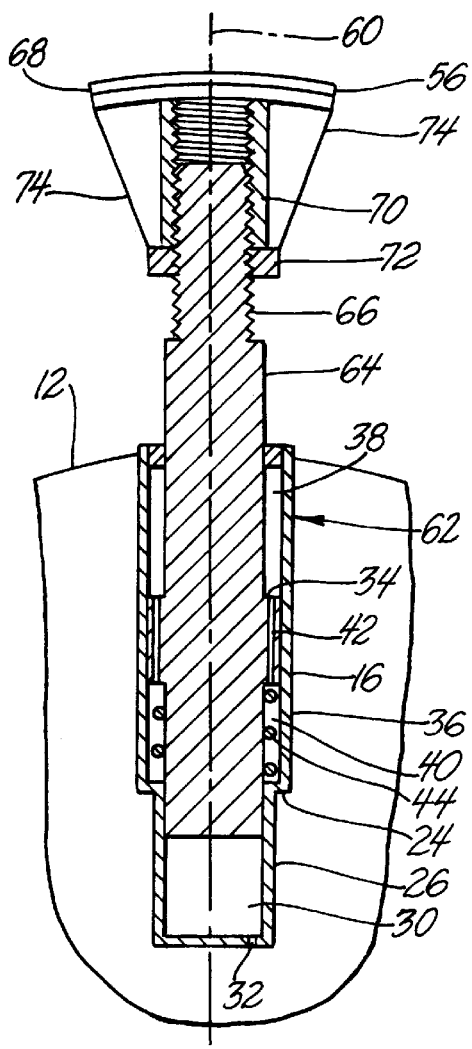
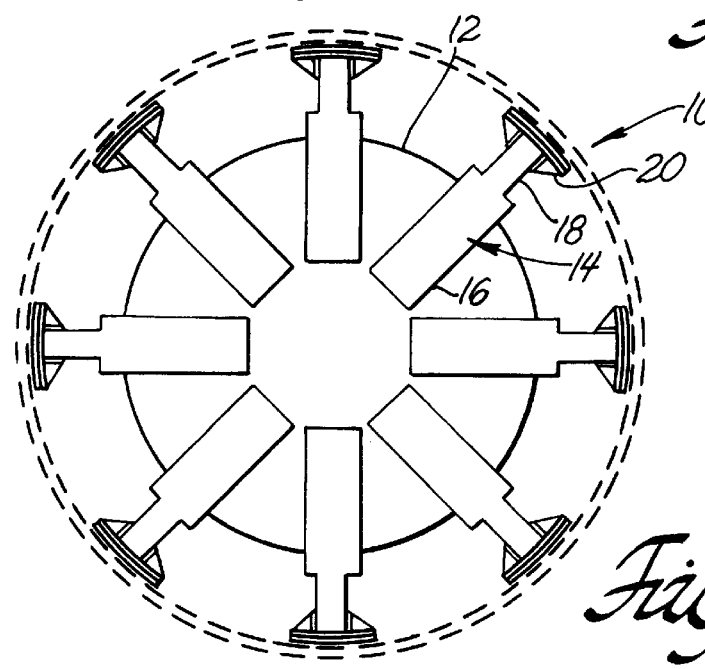

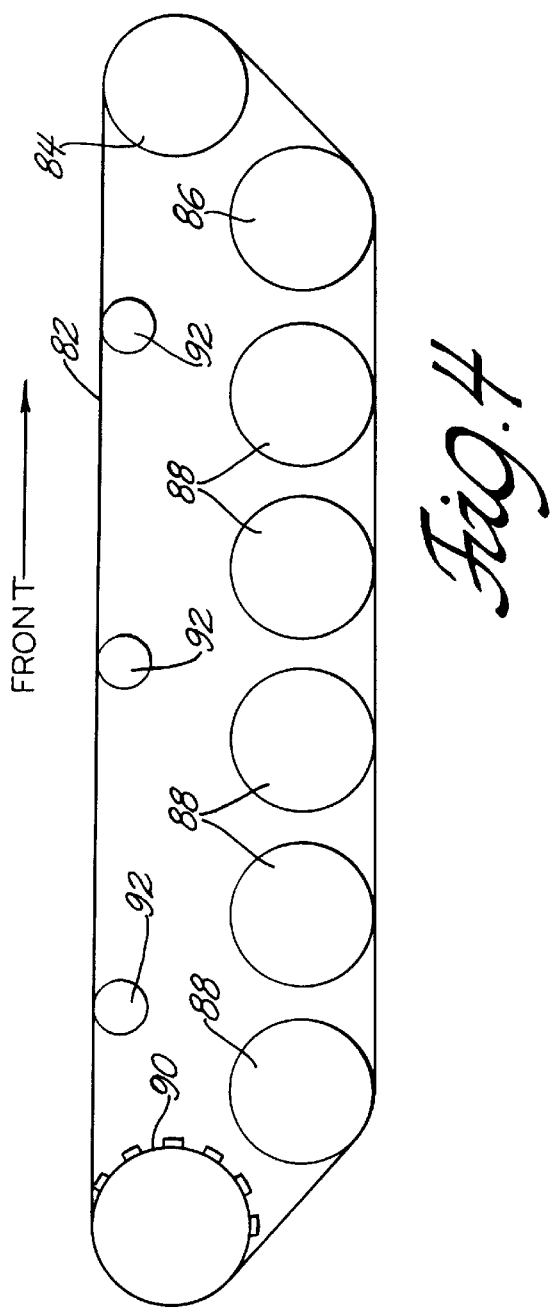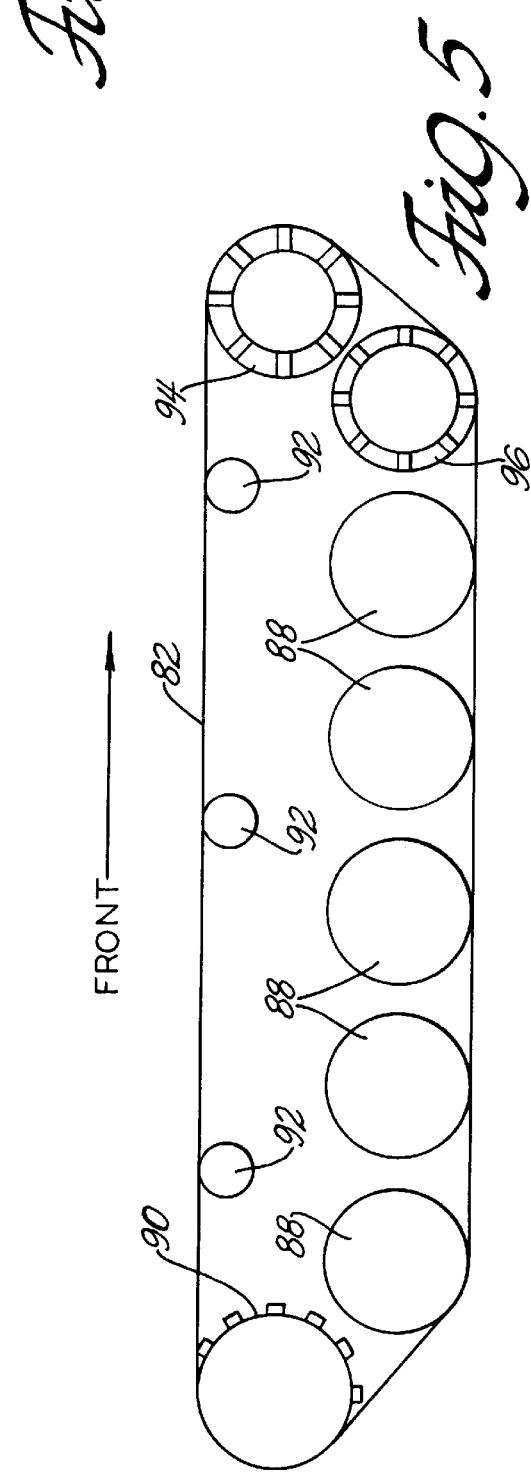

TRACKED WHEEL ASSEMBLY

GOVERNMENT USE

The invention described here may be made, used and licensed by the or for the U.S. Government for governmental purposes without paying me any royalty.

BACKGROUND AND SUMMARY

One of the fundamental decisions made when designing a military land vehicle or an off-road vehicle is the choice between wheels and tracks for the vehicle to ride on. Of course, some vehicles are hybrids, having tracks on the rear of the vehicle and wheels on the front. I propose another alternative, which is a wheel assembly where track shoes and tracks replace the tire conventionally mounted on the wheel. My proposed assembly gives vehicle designers another option in the design of future land vehicles.

My assembly comprises a shock absorbing, tracked wheel having a set of spoke-like structures radiating from the assembly's center or spider. These structures include cylinders fixed to the spider and pistons reciprocating in the cylinders. The pistons are biased outward relative to the spider by coil springs in the cylinders. Encircling the pistons are collars that separate the cylinder into two chambers and that have passages therethrough which permit restricted flow from one chamber to the other. The springs' action is dampened by the flow restrictive construction of the collar and its passages. Struts extending from the pistons have track engagement shoes on their outer ends. The shoes have arcuate sectors that engage a track or band in contact with the ground. Turning the struts about their longitudinal axis varies the distance between the cylinders and track shoes so as to adjust tension on the track. The shoes completely clear the track upon sufficient strut rotation, thus allowing the track to be removed from the assembly for repair or replacement.

BRIEF DESCRIPTION OF THE DRAWINGS

FIG. 1 is a sectioned view of a preferred spoke structure that forms a part of my tracked wheel assembly.

FIG. 2 is a sectioned view of an alternate spoke structure for the tracked wheel assembly.

FIG. 3 shows the entire wheel assembly with a band or track shown in phantom lines about the wheel assembly.

FIG. 4 is a simplified schematic diagram of a track system for a military vehicle such as a tank.

FIG. 5 is a similar diagram to that of FIG. 4, but my wheel assemblies replace the idler wheel and the number one road wheel of FIG. 4.

FIG. 6 is a typical cross section of a track engagement sector of a track shoe.

DETAILED DESCRIPTION

Figure 7:
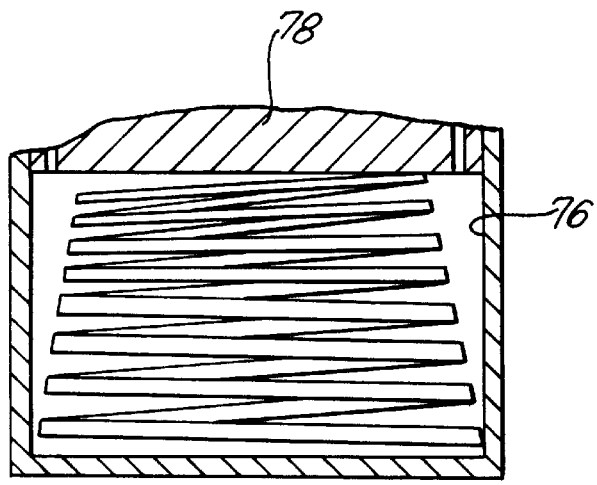
FIGS. 7 through 10 are alternate embodiments of the spring that forms a part of my wheel assembly.
Figure 8:
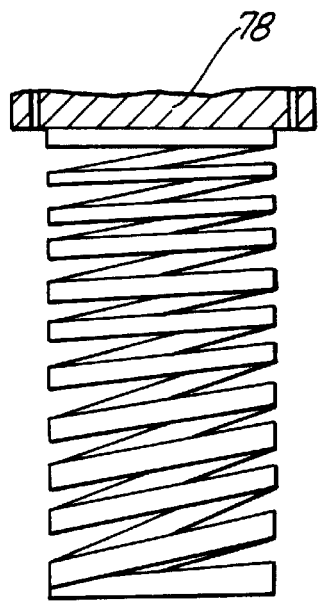

Shown in FIG. 3 is the overall structure of a tracked wheel assembly 10 having a spider 12 to which are affixed spoke structures 14. In FIG. 3, assembly 10 has eight spoke structures, but a greater or lesser number of such structures may be employed. Each spoke structure is comprised of a cylinder 16 and a piston 18 translatable in the cylinder, and each piston has a track shoe 20 affixed at the radially outer end thereof. A band or track 22 encircles assembly 10 and engages the shoes. It is contemplated that track 22 will be comprised of conventional track links or band material found on known military vehicles or road construction vehicles.

In FIG. 1 is a sectioned detail view showing the preferred embodiment of spoke structure 14. Cylinder 16 has a shoulder or step at 24. A diametrically smaller portion 26 of the cylinder closely receives a complimentary diametrically smaller portion 28 of piston 18. The respective diametrically smaller portions define a cavity 30 containing air at ambient pressure and a small port 32 allows air to enter or exit the cavity as the piston translates in the cylinder. Integral to piston 18 is a collar 34 that fits closely with the inner peripheral surface of a larger diameter portion 36 of the cylinder. The collar divides larger diameter portion 36 into two sealed circular chambers or voids 38 and 40, which are filled with hydraulic fluid. The collar defines damper passages 42 by which the voids are communicated. Disposed between collar 34 and step 24 is straight cylindrical a coil spring 44.

Piston 18 defines a threaded blind bore 46, which accepts a complimentarily threaded strut 48. The rotation of the strut causes it to extend or retract relative to the bore, thereby lengthening or shortening spoke structure 14. Threaded with the strut is a jam nut 50 that can be tightened against the radially outer end of cylinder 16 so as to fix the relative positions of the strut and cylinder 16. The radially outer end of strut 48 is not threaded and has an annulus 52 fitting closely but rotatably with a flanged ring 54, which retains the annulus on shoe 20. The shoe itself includes an arcuate track engagement sector 56 typically having a cross sectional shape exemplified by FIG. 6. Triangular plate-like ribs 58 stiffen sector 56 and strengthen its attachment to ring 54.

During normal operation of a vehicle (not shown) on which wheel assemblies 10 are installed, spoke structures 14 serve as track tensioning mechanisms for tracks 22. The track tensioning is due to the radially outward bias of springs 44 within structures 14, which results in the appropriate hoop tension on these tracks. Obviously, centrifugal force will also affect track tension. The spoke structures also serve as shock absorbing mechanisms. When wheel assembly 10 strikes an object on the ground there will be a radially inward force component along axis 60 (FIG. 1) which will be absorbed by spring 44 as it compresses. The spring's compression and subsequent expansion are dampened by the fluid in voids 38 and 40 since passages 42 restrict fluid flow between the voids and slow piston translation along axis 60. To remove track 22 from assembly 10, jam nut 50 is unscrewed from its tight engagement with cylinder 16 and strut 48 is then screwed into bore 46. This is done for as many of spoke structures 14 of wheel assembly 10 as is necessary to allow conventional track engagement projections, such as center guides 57 (FIG. 6), on shoe 20 to be removed from complimentary pockets or windows in track 22. The pockets or windows are also conventional. When it is desired to adjust track tension on wheel assembly 10, jam nut 50 is unscrewed from cylinder 16, strut 48 is rotated until the desired piston length is reached, and then jam nut is screwed down tightly against cylinder 16.

FIG. 2 shows an alternate embodiment 62 to spoke structure 14 in FIG. 1. Many elements in FIG. 2 are the same as those in FIG. 1 and have the same reference numerals. One difference in spoke structure 62 is that it has a solid, one-piece piston 64 whose threaded strut 66 is immobile relative to the rest of the piston. Additionally, shoe 68 in FIG. 2 differs from shoe 20 in that shoe 68 has an internally threaded collar 70 that screws on to strut 66. Jam nut 72 on strut 66 tightens against collar 70 to prevent relative rotation between piston 64 and shoe 68. Ribs 74 stiffen sector 56 and strengthen its attachment to collar 70. If jam nut 72 is unscrewed from collar 70, piston 64 can be rotated to translate shoe 68 radially inward and outward so as to adjust track tension or allow removal and reinstallation of track 22.

Figure 9:
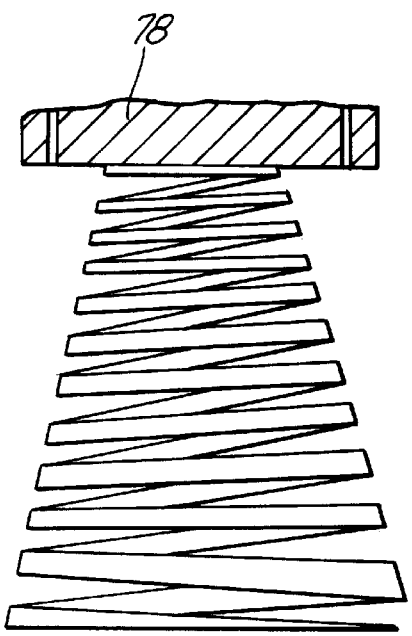
Figure 10:
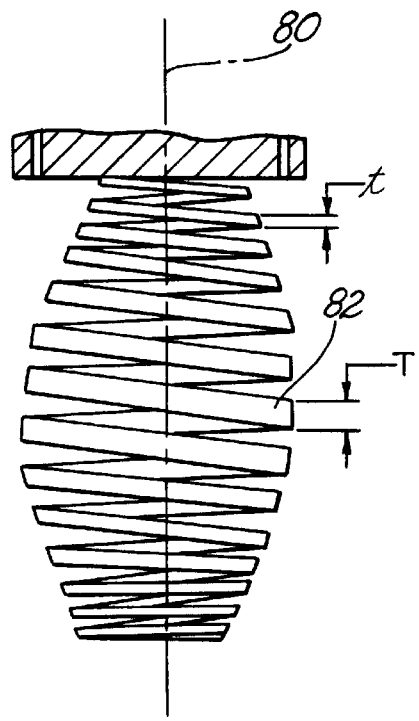

FIGS. 1 and 2 show straight cylindrical coil spring 44 whose programmed spring rate is linear. This type of programmed spring rate may not be optimal for all applications of tracked wheel assembly 10. FIGS. 7 through 10 illustrate aspects of spring design that are usable to modify spring rates to make them nonlinear. In FIGS. 7, 9 and 10, the variation of the coils' radial distance from a central spring axis 80 is exaggerated for the purpose of illustration. FIG. 7 shows a tapered coil spring whose axial compression causes individual coils to bear in a progressive sequence against a piston wall 76. In FIG. 7, as well as FIGS. 8 through 10, the coils' thickness varies from one end of the spring to the other. Thus, for example in FIG. 10 coil thickness "T" at the axial center of the coil is greater than coil thickness "t" at a coil remote from the axial center of the spring. In FIG. 9, thinner or lighter coils of a conical spring are nearer piston 78 and the coils progressively increase in thickness as a function of distance from piston 78. A similar progressive increase in coil thickness is shown for the straight cylindrical spring in FIG. 8.

FIG. 4 is a simplified schematic diagram of a track system for a military vehicle such as a tank, wherein track 82 loops around idler wheel 84, front or "number one" road wheel 86, other road wheels 88, drive sprocket 90 and track support wheels 92. Track 82 is regarded as having a tractive, or gripping engagement with the road or terrain surface on which the vehicle travels. FIG. 5 is a similar diagram, but wheel assemblies 94 and 96 replace wheels 84 and 86. Wheel assemblies 94 and 96 are the same as wheel assembly 10 except that track 22 is removed and assemblies 94 and 96 engage track 82 instead. Adjusting the position of the piston or shoes of assemblies 94 and 96 as previously described with respect to assemblies 10 will adjust the tension on track 82. In addition, wheel assembly 96 will provide shock absorption when the forward end of track 82 strikes a log or rock or other obstacle. Of course, wheels 88 can be replaced with more wheel assemblies 96 as well.

I wish it to be understood that I do not desire to be limited to the exact details of construction or method shown herein since obvious modifications will occur to those skilled in the relevant arts without departing from the spirit and scope of the following claims.

What is claimed is:

1. A shock absorbing, wheel-and-track assembly to enhance the ability of land vehicle to travel off-road, comprising:

a spider;

a set of spoke structures connected to the spider;

cylinders of the spoke structures connected to the spider;

pistons axially translatable in the cylinders;

piston collars on the pistons, the piston collars closely and slidingly fitting against inner peripheral walls of the cylinders, whereby the piston collars separate volume within the cylinder into two axially spaced cylindrical zones;

fluid within the zones;

passages through the collar communicating one of the zones to another of the zones;

struts extending from the pistons;

track shoes on the struts, the track shoes having a generally arcuate track engagement sector;

a ground contacting track engaged by the shoes;

means in the assembly for governing the tension of the track;

the governing means including means for adjusting the distance of the shoes from the cylinders in response to rotation of the strut about an axis passing longitudinally through the strut;

the governing means further including means for controlled disabling of the adjusting means so as to lock the shoes in chosen positions relative to the cylinders.

2. The assembly of claim 1 further comprising a spring within the cylinder biasing the piston radially outward of the spider.

3. The assembly of claim of claim 1 wherein:

the piston defines an internally threaded piston bore;

the strut has external threads complimentary to the piston bore; and the disabling means includes a jam nut on the strut, wherein rotation of the jam nut engages or disengages the jam nut with the cylinder.

4. The assembly of claim of claim 1 wherein:

The shoe has a shoe collar;

The shoe collar piston defines an internally threaded collar bore;

the strut has external threads complimentary to the collar bore; and the disabling means includes a jam nut on the strut, wherein rotation of the jam nut engages or disengages the jam nut with the shoe collar.

5. The assembly of claim 1 wherein the ground contacting track is a generally circular component that girds the assembly.

\* \* \* \* \*